Patented Dec. 4, 1951

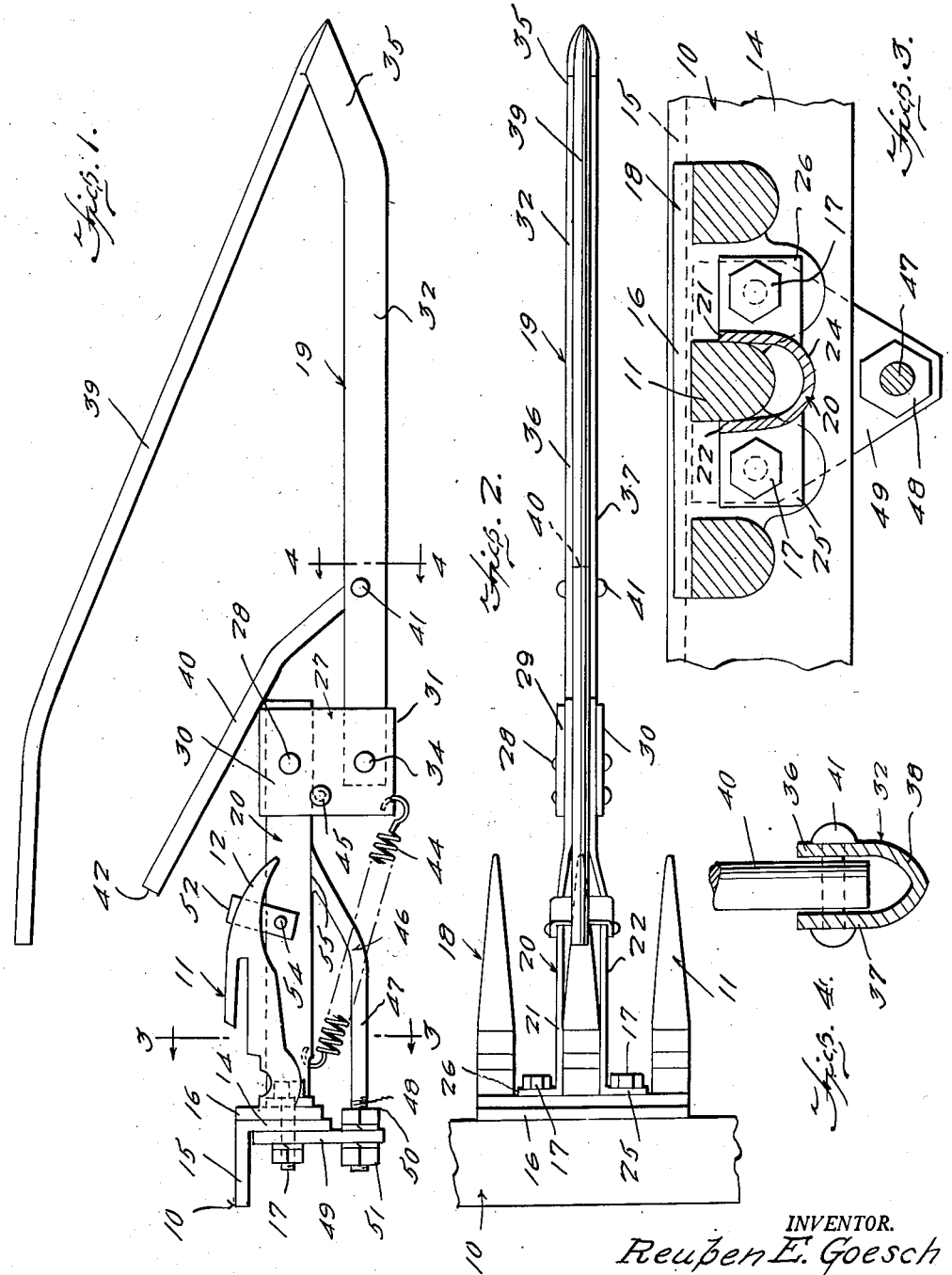

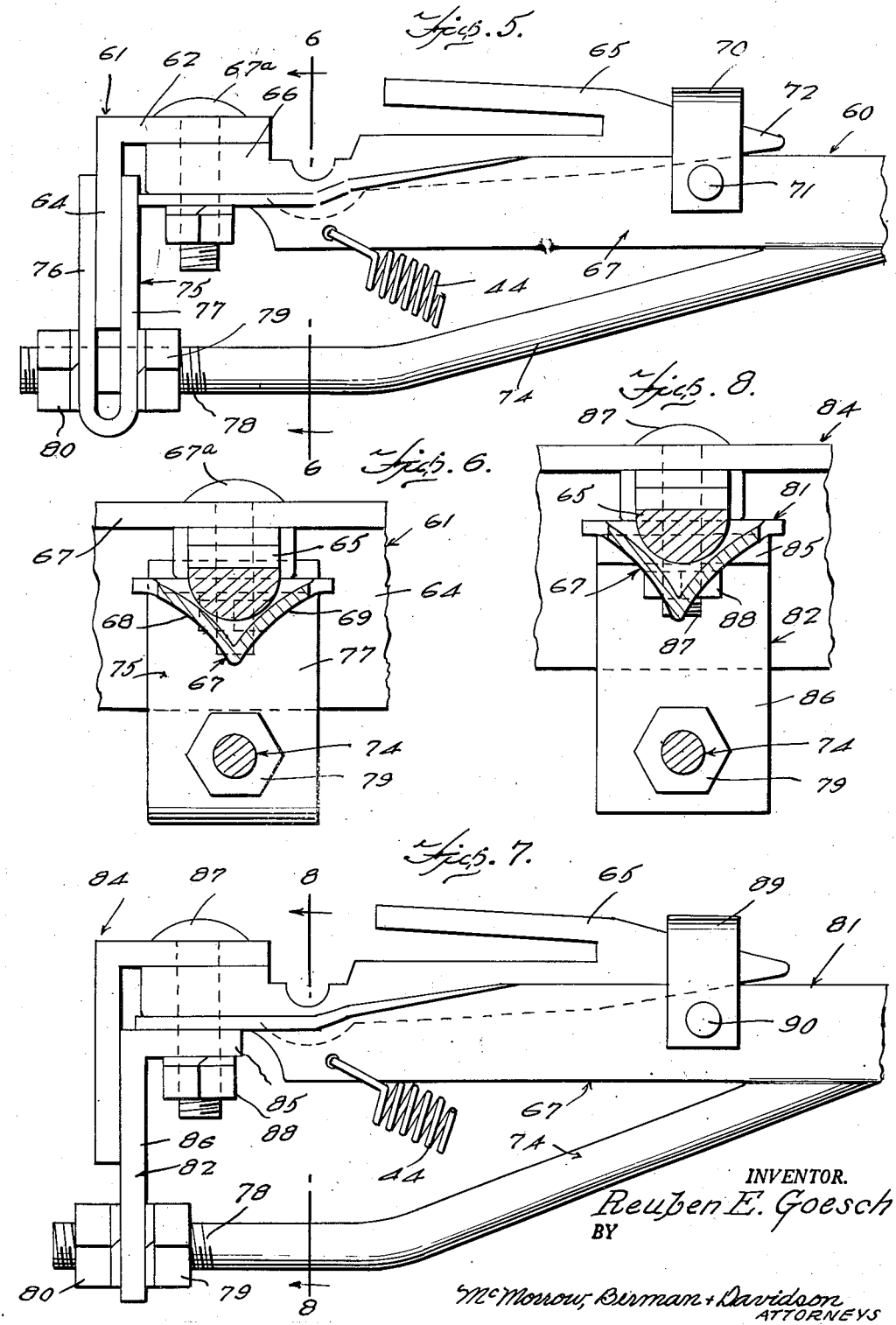

2,577,324

UNITED STATES PATENT OFFICE 2,577,324

PICKUP GUARD

Reuben E. Goesch, Sutton, Nebr.

Application March 29, 1949, Serial No. 84,045

3 Claims. (Cl. 56—312)

1

This invention relates to an improved grain saver or grain guard for combines, binders, headers, and the like having sickle bars.

It is an object of this invention to provide a pick-up guard attachment of the kind to be more particularly described hereinafter, for lifting the grain or other material to be cut by the sickle bar, the guard attachment being yieldably mounted on the conventional guard in such a manner as to eliminate the undue strain of such attachments imposed on the conventional guards when the grain saver or guard strikes a solid obstruction, or tangled and matted fallen grain.

Another object of this invention is to provide a device of this kind for attachment to grain savers and guards operable in a manner to prevent the ordinary grain guards from bending or breaking, and causing the ordinary guard to obstruct the movement of the cutting sickle, thereby breaking or damaging the sickle section and other parts of the machine.

A further object of this invention is to provide a guard attachment adjustable on the sickle bar guard providing for the regulation of the grain saver or grain guard to a uniform height, the adjusting means or brace being adjustably connected to the sickle bar, whereby the forces of striking obstructions by the guard attachment will be applied to the sickle bar rather than to the ordinary guard or teeth. Suitable brackets are provided for attaching the adjustable end of the brace to the various-shaped sickle bars of the several makes and types of grain-saving and cutting machines.

With the above and other objects in view, my invention consists in the arrangement, combination and details of construction disclosed in the drawings and specification, and then more particularly pointed out in the appended claims.

In the drawings:

Figure 1 is a side elevation of a pick-up guard constructed according to an embodiment of my invention;

Figure 2 is a top plan view thereof;

Figure 3 is an enlarged fragmentary transverse section taken on the line 3—3 of Figure 1;

Figure 4 is a fragmentary detail, transverse section taken on the line 4—4 of Figure 1;

Figure 5 is an enlarged fragmentary side elevation, partly broken away, of a pick-up guard constructed according to an embodiment of my invention applied to a different type of sickle bar;

Figure 6 is a fragmentary transverse section taken on the line 6—6 of Figure 5;

Figure 7 is an enlarged fragmentary side elevation, partly broken away, of the pick-up guard applied to a third form of sickle bar;

Figure 8 is a fragmentary transverse section taken on the line 8—8 of Figure 7.

Referring to the drawings, the numeral 10 designates generally a sickle bar or mower platform on a conventional form of mower machine, having a forwardly-extending guard finger 11 mounted thereon. The guard 11 is formed in a substantially conventional manner, having one of the cutting teeth formed integrally therewith, with the intermediate or rearmost portion thereof, and having a forwardly- and downwardly-inclined forward end 12. The sickle bar 10 is formed as an elongated metal bar of angular configuration having a vertical arm 14 and a horizontal arm 15 fixed to or formed integrally with the upper end of the vertical arm 14. The horizontal arm 15 extends rearwardly from the vertical arm 14 and the guard 11 is fixed to the forward side of the vertical arm 14. The guard 11 is one of a unit of three similar guards fixed to the forward side of a supporting bar 16, which is secured to the forward side of the vertical arm 14 of the sickle bar 10. Bolts 17, or other suitable, replaceable, fastening means are adapted to be extended through the connecting or rear bar 16 and the vertical bar 14 of the sickle bar 10. The bolts 17 secure the guards 11 of the guard unit 18 to the forward side of the sickle bar 10.

A pick-up guard 19 is adapted to be secured to the forwardly-extending guards 11 of the guard unit 18 and to be supported from the vertical arm 14 of the sickle bar 10. The pick-up guard 19 includes a horizontally-extending, U-shaped attaching bracket 20 which is adapted to be secured to the forward side of the connecting bar 16 on the forward side thereof and below one of the guards 11. The U-shaped bracket 20 includes a pair of vertically-extending side arms 21 and 22 connected together by an arcuate bight portion 24 at the lower end thereof. The bight portion 24 is adapted to be disposed below the bottom of the guard 11 and the side arms 21 and 22 are adapted to be engaged on the opposite sides thereof so that the bracket 20 will embrace the guard 11 on the lower side thereof. A pair of outwardly-extending flanges or ears 25 and 26 are fixed to or formed integrally with the rear end of the bracket 20 to provide attaching means for securing the bracket to the sickle bar. The flanges or lugs 25 and 26 are adapted to overlie the forward side of the connecting bar 16 on the forward side thereof and are formed with openings through which the bolts 17 may be extended.

As the guard unit 18 generally is formed with three guards 11, the bracket 20 is adapted to be engaged about the center guard 11 so that the tabs 25 and 26 are disposed between the center guard and the outermost ones.

A U-shaped bracket 27 is pivotally mounted on the forward end of the bracket 20 by a pivot pin 28. The U-shaped bracket 27 includes a pair of side arms 29 and 30 connected together at the bottom ends thereof by a bight portion 31. The upper ends of the side arms 29 and 30 are connected to the forward end of the bracket 20 by the pivot pin 28, which extends through the upper ends of the side arms and through the forward end of the bracket. The bight portion 31 of the bracket 27 is disposed downwardly in spaced relation to the lower side of the fixed bracket 20. A forwardly-extending arm or member 32 is secured in the bight portion of the bracket 27 by a rivet or other suitable fastening device 34 which extends through the lower ends of the side arms 29 and 30 and through the rear end of the member 32 which is seated on the upper surface of the bight portion 31. The arm or member 32 extends forwardly from the front side of the bracket 27 and the extreme forward end of the member 32 is upturned, as indicated by the numeral 35 in the drawings. The member 32 is also U-shaped in configuration, having a pair of side arms 36 and 37 connected together at the bottom ends thereof by a bight portion 38.

An upwardly- and rearwardly-extending bar 39 is fixed to the extreme forward end of the bar or member 32 and extends rearwardly over the guard 11. The rear end of the bar 39 is spaced above the guard 11 and sickle bar 10, as clearly noted in Figure 1 of the drawings. A second bar 40 is pivotally connected to the forwardly-extending arm or member 32 a short distance in front of the bracket 27 and extends upwardly and rearwardly between the upper bar 39 and the supporting member 32. The pivoted bar or member 40 is secured at its lower end by a pin 41 which extends between the side arms 36 and 37 of the member 32, the lower end of the bar 40 being disposed between the side arms. In the normal position of the bar 40, the lower surface of the bar rearwardly of the pivot pin 41 will bear against the forward end of the bracket 20, and the bracket 27, positioning the extreme rear end 42 of the bar 40 above the forward end of the guard 11.

A spring 44 is connected between the lower end of the bracket 27 on the rear end thereof, and the bottom side of the bracket 20 adjacent the sickle bar 10. The spring 44 normally biases the bar or member 32 downwardly about the pivot 28 and is held in a substantially horizontal, forwardly-directed position by a stop pin or stop member 45 which is fixed between the side arms 21 and 22 of the bracket 27 rearwardly, below the pivot pin 28. The stop bar 45 is adapted to engage the lower bight portion 24 of the bracket 20 for limiting the swinging movement of the bar 32 about its pivot. The spring 44 provides for the yielding of the pick-up guard about the pivot therefor when the pick-up guard 19 will engage a fixed obstruction in the path of travel of the sickle bar-carrying the guard. In this manner, the obstruction will not force an undue stress or strain on the guard 11, nor on the pick-up guard 19.

For suitably placing the pick-up guard 19 on the forward side of the sickle bar 10, I have provided a novel brace 46 which is positioned between the bracket 20 and an attaching means carried by the rear side of the sickle bar 10. The brace 46 is formed of an elongated rod, which is welded at its forward end to the lower surface of the bracket 20 adjacent the forward end thereof rearwardly of the bracket 27. The welded connection of the rod or brace 46 is disposed below the point 12 of the ordinary guard 11. The brace 46 extends downwardly and rearwardly, terminating in a substantially horizontally-extending bar 47 spaced below the bracket 20. The rear end of the brace 46 is threaded, as noted by the numeral 48 in the drawings and is adapted to be extended through an aperture in a supporting plate 49. The supporting plate 49 is adapted to be fixed to the rear side of the vertical arm 14, which constitutes the depending portion of the sickle bar 10. The supporting plate 49 engages the bolts 17 which secure the bracket 20 and the guard 11 to the sickle bar. A nut 50 is threadably engaged on the threaded rear end 48 of the bracing bar 47 and is adapted to be positioned on the forward side of the plate 49. A second nut 51 is threadably engaged on the extreme rear end of the brace 46 on the rear side of the plate 49 so that the plate 49 may be clampingly secured between the nuts 50 and 51.

The engagement of the nuts 50 and 51 on the opposite sides of the plate 49 provides for the adjustable positioning of the bracket 20 carrying the pick-up guard in its vertical relation to the sickle bar 10 and the guard 11.

A clip 52, substantially U-shaped in configuration, is pivotally mounted on the bracket 20 intermediate the length thereof for engagement over the front, downwardly-turned point 12 of the guard 11. The clip 52 is adapted to loosely engage over the upper surface of the forward end 12 of the guard 11 for positioning the bracket 20 and the pick-up guard 19 relative thereto. The pivot pin 54 on which the clip 52 is mounted to the bracket 20 is positioned rearwardly of the welded connection 55 of the forward end of the bracing bar 46 to the bracket 20. The threaded connection of the nuts 50 and 51 on the threaded rear end 47 of the brace 46 provides for the adjustment of the plate 49 longitudinally of the bracing bar 46 to provide for the substantial pivoted movement of the forward end of the bracket 20 about the fixed rear end thereof. In other words, upon moving of the rear end of the brace 46 forwardly, the forward end of the bracket 20 carrying the pick-up guard 19 is biased upwardly relative to the horizontal arm 15, while the rear end or plates 25 and 26 are rigidly secured to the connecting bar 16 on which the guards 11 are mounted. This movement upwardly of the forward end of the bracket 20 results in a strain in the rear end of the bracket and on the bolts 17, but such strain may readily be absorbed by the substantial structure of the bar 16 and the sickle bar 10. This formation provides for the absorbing of such strains by the sickle bar rather than by the guards 11 which are mounted on the sickle bar. The engagement of the clip 52 over the forward ends of the guards 11 provides for the floating engagement of the pick-up guard attachment relative to the fixed or ordinary guard 11 which remains stationary upon adjustment of the attachment.

In Figures 5 and 6 there is shown a modification of pick-up guard 60 constructed according to an embodiment of my invention. The pick-up guard 60 is formed in substantially the same manner as the pick-up guard 20 described above, but is particularly adapted for a different type of sickle bar 61. The sickle bar 61 is also L-shaped in configuration having a horizontally-extending upper bar or arm 62 and a depending vertical bar or arm 64 on the rear end of the horizontal bar. The sickle bar 61 is substantially a reversed sickle bar 10 and the ordinary guards 65 are secured in a different manner. The ordinary guards 65 are formed with a rearwardly-extending, horizontal portion 66 which is adapted to be engaged under the forwardly-extending horizontal arm 62 of the sickle bar 61. A bolt 67a engages through the top arm 62 and through the rearwardly-extending portion 66 of the guard 65 for securing the guards to the sickle bar. The bracket 67 on which the pick-up guard of my invention is mounted is V-shaped in configuration, having a pair of side arms 68 and 69 which are adapted to underlie the lower surface of the guard 65 and to be extended forwardly from the extreme forward end thereof. The extreme rear end of the bracket 67 is flattened out so that the flattened V-shaped bracket 67 may be engaged on the lower side of the guard 65 to be secured on the sickle bar 61 by the same bolt 67 that secures the guard 65 thereto.

The forward portion of the pick-up guard 60 is formed in substantially the same manner as the forward portion of the pick-up guard 19 forwardly of the bracket 52 described therefor. A clip 70 is pivotally mounted on the intermediate portion of the bracket 67 by a pivot pin 71 so that the clip 70 will loosely engage over the extreme forward end 72 of the guard 65. The engagement of the clip 70 over the forward end of the guard 67 provides for the floating engagement of the pick-up guard 60 therewith.

A bracing member 74 is secured to the lower rear end of the bracket 60 in substantially the same manner as the downwardly- and rearwardly-extending bracket 46 described above. The forward end of the bracing bar 74 is secured by welding or other suitable fastening means to the forward portion of the bracket 60 forwardly of the pivot pin 71, and slightly forwardly of the extreme forward end of the ordinary guard 65. The rear end of the bracing bar 64 is supported from the sickle bar 61 by a modified form of attaching member, the attaching member for the bar or brace 74 being designated by the numeral 75 in Figure 5 of the drawings. The attaching member 75 is substantially U-shaped in configuration, being formed of a flat plate bent upon itself intermediate the length thereof. The side arms of the attaching member 75 engage on the forward and rear sides of the vertical bar or arm 64 of the sickle bar 61. The sickle bar is clampingly engaged between the inner surfaces of the vertically-extending arms 76 and 77 of the fastening member 75. The lower ends of the arms 76 and 77 are formed with openings therethrough, through which the extreme rear end of the brace 74 is adapted to be engaged. The rear end of the brace 74 is threaded, as indicated by the numeral 78, and a front nut 79 is adapted to engage the front surface of the forward arm 77, while a rear nut 80 is adapted to engage the rear surface of the rear arm 76 for clampingly securing the rear end of the brace 74 thereto and for clampingly securing the supporting member 75 to the depending arm 74 of the sickle bar 61. The connection of the pick-up guard 60 and its brace 74 to the sickle bar 61 is substantially the same as the connection of the pick-up bar 19 and its brace 47 to the respective sickle bar 10, the adjustment of the sickle bar 60 about the rear end thereof being accomplished by the adjustment of the nuts 79 and 80 along the threaded rear end portion of the adjusting brace 74, which is fixed at its forward end to the bracket 60 forwardly of the fixed connection of its rear end and forwardly of the extreme forward ends of the respective ordinary guards 65.

In Figures 7 and 8 of the drawings, there is shown a second modified form of this invention, wherein the pick-up guard formed and supported according to an embodiment of my invention is supported on a third type of conventional sickle bar. The pick-up guard 81, as shown in Figures 7 and 8 of the drawings, is formed in substantially the same manner as the pick-up guard 60 described above. However, the rear end of the brace 74 is carried by a supporting member 82 which is fixed to the sickle bar 84. The sickle bar 84 is L-shaped in configuration in substantially the same manner as the sickle bar 61 described above. In place of using the clamping member 75 for securing the rear end of the brace 74, an L-shaped plate or supporting member 82 is used. The supporting member 82 is formed with a horizontally-extending top arm 85 and a depending, vertically-extending arm 86 fixed to or secured on the extreme rear end of the horizontal bar or arm 85. The arm 85 is adapted to be secured to the sickle bar 84 by the bolt 87 which extends through the rear end of the ordinary guard 65, the rear end of the channel bracket 67 and the top horizontal arm 85. A nut 88 threadably engaged on the lower end of the bolt 87 engages below the horizontal arm 85 for fixedly securing the supporting member 82 on the sickle bar 84. The depending vertical arm 86 is formed with an opening in the lower end thereof through which the rear threaded end 78 of the brace 74 is adapted to be extended. The nuts 79 and 80, threaded on the rear end 78 of the bracing bar 74, secure the bracing bar to the supporting member 82. The adjustment of the pick-up guard 81 relative to the ordinary guard 65 and to the sickle bar 84 is formed in substantially the same manner as the adjustment of the pick-up guards 60 and 19 described above. A clip 89 is pivotally mounted by a pivot pin 90 on the bracket 67 rearwardly of the connection of the brace 74 thereto. The clip 89 provides for the floating attachment of the pick-up guard 81 in the same manner as the pick-up guards 60 and 19.

I do not mean to confine myself to the exact details of construction herein disclosed, but claim all variations falling within the purview of the appended claims.

I claim:

1. An attachment for securing a pick-up guard to one of a plurality of longitudinally extending guard fingers projecting from the front of a mower platform comprising a bracket positioned longitudinally of and in partial embracing relation with respect to one of said guard fingers and having one end secured to said mower platform, the other end of said bracket being adapted to be connected to a pick-up guard arranged in end to end relation with respect to said other end, a clip positioned longitudinally of and above said bracket intermediate the ends thereof and having its ends secured to said bracket for embracingly receiving a portion of said one guard finger, and a brace rod arranged below and in parallel spaced relation with respect to said bracket, and having one end dependingly and adjustably secured to said mower platform and having the other end secured to said bracket adjacent to and spaced from the other end thereof.

2. An attachment for securing a pick-up guard to one of a plurality of longitudinally extending guard fingers projecting from the front of a mower platform comprising a U-shaped bracket having its bight facing upwardly positioned longitudinally of and in partial embracing relation with respect to one of said guard fingers and having one end secured to said mower platform, the other end of said bracket being adapted to be connected to a pick-up guard arranged in end to end relation with respect to said other end, a U-shaped clip having its bight facing upwardly positioned longitudinally of and above said bracket intermediate the ends thereof and having its ends secured to said bracket for embracingly receiving a portion of said one guard finger, and a brace rod arranged below and in parallel spaced relation with respect to said bracket, and having one end dependingly and adjustably secured to said mower platform and having the other end secured to said bracket adjacent to and spaced from the other end thereof.

3. An attachment for securing a pick-up guard to one of a plurality of longitudinally extending guard fingers projecting from the front of a mower platform comprising a bracket positioned longitudinally of and in partial embracing relation with respect to one of said guard fingers and having one end secured to said mower platform, the other end of said bracket being adapted to be connected to a pick-up guard arranged in end to end relation with respect to said other end, a clip positioned longitudinally of and above said bracket intermediate the ends thereof and having its ends secured to said bracket for embracingly receiving a portion of said one guard finger, a supporting plate positioned in side by side relation with respect to said mower platform front and dependingly secured to the latter, a brace rod arranged below and in parallel spaced relation with respect to said bracket, and having one end dependingly and adjustably secured to said supporting plate and having the other end secured to said bracket adjacent to and spaced from the other end thereof.

REUBEN E. GOESCH.

REFERENCES CITED

The following references are of record in the file of this patent:

UNITED STATES PATENTS

| Number | Name | Date |
|---|---|---|
| 1,818,335 | Kenison | Aug. 11, 1931 |
| 2,261,118 | Kanehl | Nov. 4, 1941 |
| 2,290,404 | Cardinal | July 21, 1942 |